United States Patent [19]

Stenstrom et al.

[11] 4,428,450

[45] Jan. 31, 1984

[54] RACK AND PINION STEERING GEAR

[75] Inventors: Craig A. Stenstrom, Saginaw; Alan D. Holzhausen, Frankenmuth; Thomas R. Stepp, Jr., Saginaw, all of Mich.

[73] Assignee: General Motors Corporation, Detroit, Mich.

[21] Appl. No.: 418,449

[22] Filed: Sep. 15, 1982

[51] Int. Cl.³ .............................................. B62D 5/06
[52] U.S. Cl. ..................................... 180/148; 74/498; 280/96; 308/3 R
[58] Field of Search ............... 180/148, 155, 156, 157, 180/158, 159, 160; 280/96; 74/422, 498, 89.17; 308/3 R

[56] References Cited

U.S. PATENT DOCUMENTS 3,572,158 3/1971 Adams .................................. 74/422

FOREIGN PATENT DOCUMENTS 2406566 8/1975 Fed. Rep. of Germany ...... 180/148

OTHER PUBLICATIONS

GM Publication S-8210-J, p. 3B2-9, © 1981, J-2000 Service Manual for 1982.

Primary Examiner—Joseph F. Peters, Jr.
Assistant Examiner—D. Lynn Fugate
Attorney, Agent, or Firm—Charles R. White

[57] ABSTRACT

Rack and pinion steering gear incorporating a rack guide providing a takeoff for steering linkage actuation, the rack guide has shock absorbers formed at the opposite ends thereof for the cushioned engagement with stop shoulders in the steering gear housing at opposite ends of the rack guide track, the rack guide has spring finger runners integrally formed at opposite sides of the guide engaging the track for lash reduction and for the low friction sliding of the guide in the track.

4 Claims, 7 Drawing Figures

RACK AND PINION STEERING GEAR

This invention relates to vehicle steering gears and more particularly to a rack and pinion steering gear featuring a new and improved sliding rack guide with shock absorbers at the ends thereof to cushion and limit rack travel and with integral spring arms to provide a lash-free sliding fit with the steering gear housing.

Prior to the present invention, center take-off rack and pinion steering gears often incorporated a sliding rack guide mounted in a rectilinear track in the aluminum gear housing which, with the tie rod bolts, provide the connection between the tie rods and the rack to allow the gear to steer the road wheels. While these prior rack guides have effectively performed as intended, they are generally complex in construction, usually made from powder metal, and add materially to the cost and the weight of the steering gear. Furthermore, these prior guide constructions utilize special shell-like plastic slide or bearing clips secured thereto to engage the track to reduce friction and take up lash. Travel stops were generally metal-to-metal contact between the guide and parts of the housing forming the end of the track.

As an improvement to prior designs, the preferred embodiment of the present invention comprises a molded rack guide of impact grade acetal which receives two steel insert bushings that connect to the ends of the tie rods and transmits the steering loads to the tie rods for steering purposes. With this invention, the rack guide has improved low friction, sliding capability without additional bearing clips. More specifically this invention features integral spring arms or runners on opposite sides of the rack guide to yieldably engage the track and compensate for clearances between the rack guide and the track therefore so that loose fitting components are avoided. Also, the rack guide of this invention incorporates shock tubes or cushion bumpers on opposite ends thereof which, on contact with stop surfaces at the ends of the track, deflect and effectively dissipate impact energy and cushion the guide at the end of travel. This reduces part wear and dampens out end travel noise. After deflection and cushioning of impacts, the walls of the shock tube having good memory recover to their cylindrical shape at a predetermined rate of recovery.

This is a feature object and advantage of this invention to provide a new and improved rack and pinion steering gear featuring a rack guide having a low friction, lash-free sliding fit in the rack housing which further provides for cushioning of rack guide impacts at either end of the travel.

It is another feature object and advantage of this invention to provide a new and improved rack and pinion steering gear having a unitized rack guide of a suitable plastic type material which features openings that receive bushings that operatively connect the inner tie rods and take the compressive steering loads thereof. This invention further incorporates radial shock tubes or cushion bumpers at the end of the rack guide that effectively dampen out in travel noise of the guide and features spring-like fingers at opposite sides thereof which engage the surfaces of a track formed in the housing of the gear to provide for the lash-free sliding fit in the gear housing.

These and other features, objects and advantages of this invention will be more apparent from the following detailed description and drawings in which.

Figure 1:
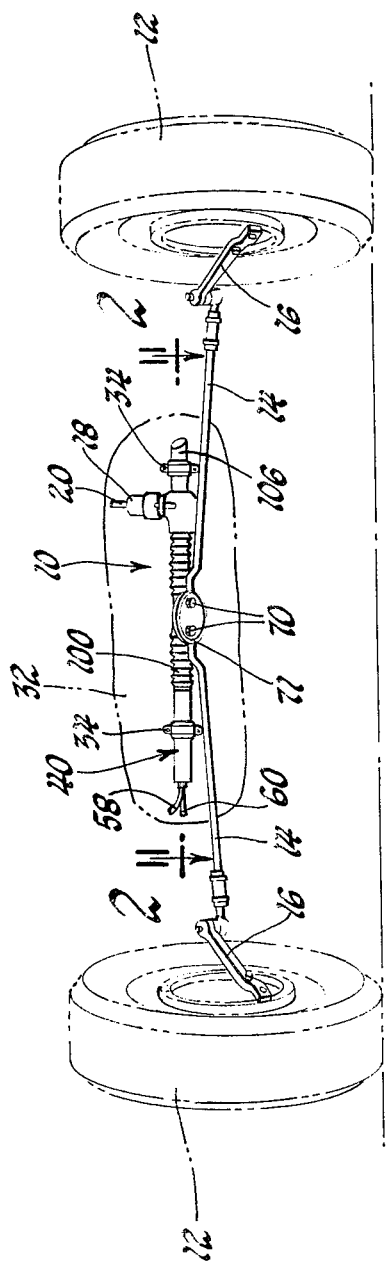
FIG. 1 is a front view of a steering gear assembly, tie rod and road wheels of a vehicle.

Turning now in greater detail to the drawing, there is shown in FIG. 1 a rack and pinion steering gear 10 operatively connected to a pair of dirigible vehicle road wheels 12 by tie rod assemblies 14 and steering arms 16. The steering gear 10 has a conventional integral valve 18 with a centralized stub shaft 20 adapted to be turned by a vehicle operator through a conventional steering wheel and steering shaft operatively connected thereto. The stub shaft 20 is drivingly connected to a pinion gear 24 whose teeth mesh with the teeth 26 of a rack 28 which is mounted for sliding movement in a tubular housing 30 preferably of a suitable light weight metal such as aluminum. With this arrangement, rotation of the pinion gear 24 by the stub shaft 20 will cause lateral sliding movement of the rack to the left or right to selected extents in accordance with the degree and rotational direction of steering input to effect selected steering of the road wheels 12. The housing 30 is secured to a cowl 32 or other support structure of the vehicle by left and right hand side bracket 34. The inboard end of rack 28 is threaded or otherwise connected to the end of a piston rod 36 which extends axially through a piston rod guide and seal assembly 38 secured within the inboard end of housing 30. A piston 42, connected to the end of the piston rod 36, is operatively mounted in a power cylinder 40 to provide hydraulic power assist steering when the integral valve 18 is actuated through the stubshaft. The power cylinder 40 comprises an inner cylinder 44, in which the piston 42 is mounted to form pressure chambers 46 and 48, and a concentric outer cylinder 50 secured to the end of housing 30 by threaded fasteners 52. The inner cylinder 44 is mounted on an annular shoulder of the piston rod guide and seal assembly and cooperates with the outer cylinder 50 to form a fluid passage 56 which communicates with chamber 48.

Hydraulic power lines 58 and 60 threaded into a bulkhead 62 at the free end of the power cylinder operatively connect the integral valve 18 and a source of hydraulic pressure not shown, with pressure chambers 46 and 48 of the power cylinder to effect hydraulic powered stroking movement of the piston 42 and the power assist movement of the rack in accordance with steering gear input. As shown, line 58 connects into chamber 48 via passage 56 while line 60 communicates with chamber 46 directly through the bulkhead. With these lines interconnected with the integral gear, the chambers can be selectively charged or exhausted for powered steering.

The steering gear housing 30 is formed with a generally rectilinear inner opening, the side walls of which form a track 66 for a rack guide assembly 68.

Figure 2:
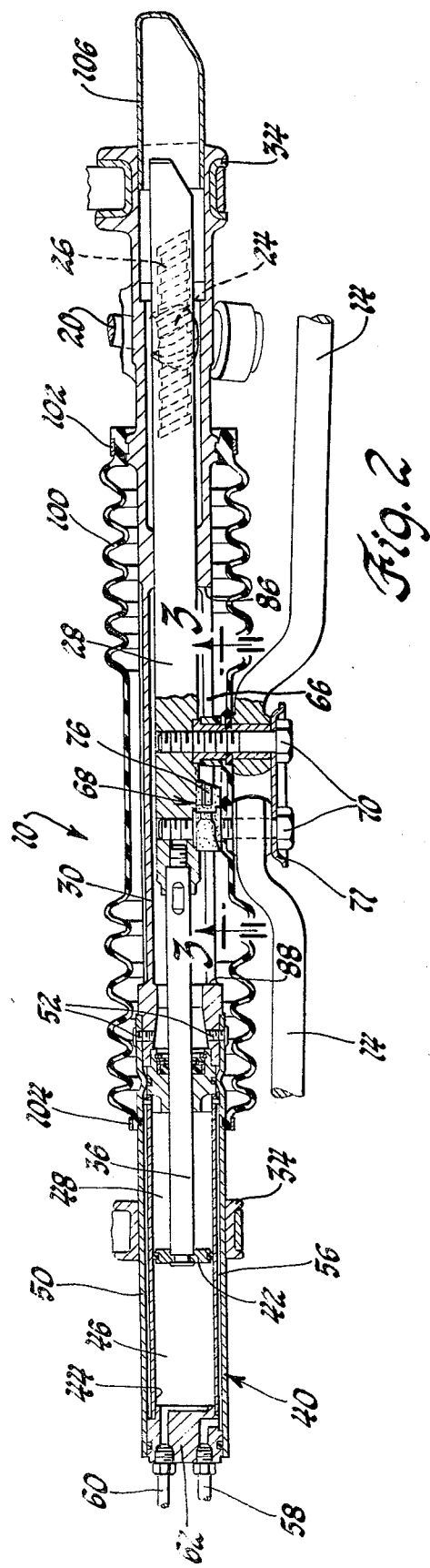
FIG. 2 is a longitudinal view partially in section of the steering gear of FIG. 1 and taken along lines 2—2 of FIG. 1.

The rack guide assembly 68 provides a slidable carriage operating with low friction in the track 66. The rack guide assembly 68 and bolt members 70 form the connection of the rack 28 with the ends of tie rod 14. As shown in FIG. 2, the bolt member 70 projects through bolt support plate 71 and cylindrical steel bushings 72, mounted in cylindrical openings 74 in the body 76 of the rack guide assembly, into threaded connection with the rack 28.

Figure 3:
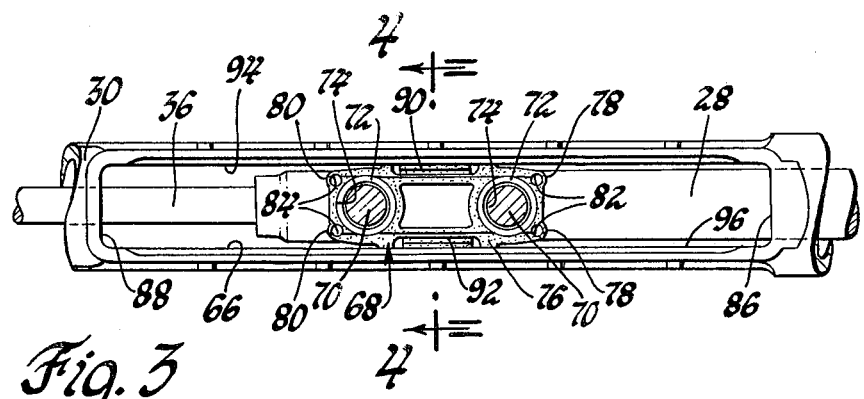
FIG. 3 is a view partially in section taken generally along lines 3—3 of FIG. 2.
Figure 4:
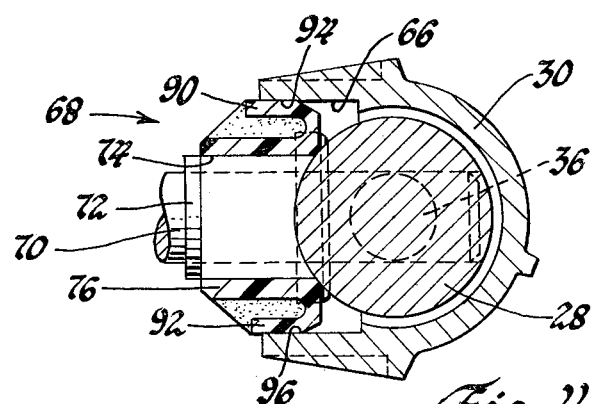
FIG. 4 is a sectional view taken along lines 4—4 of FIG. 3.
Figure 6:
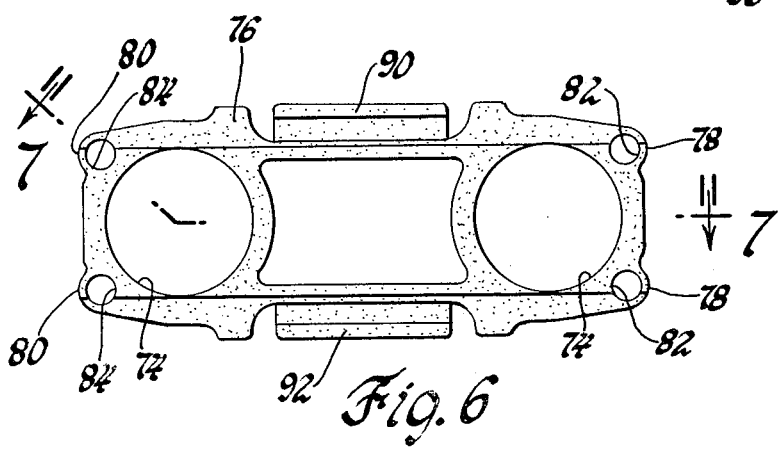
FIG. 6 is an enlarged top plan view of the rack guide.
Figure 5:
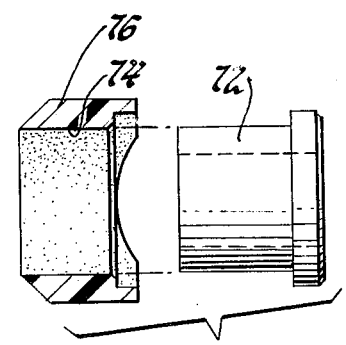
FIG. 5 is an exploded view of the rack guide.
Figure 7:
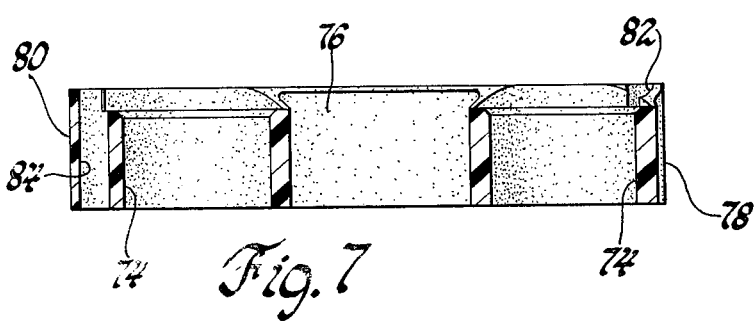
FIG. 7 is a sectional view taken along lines 7—7 of FIG. 6.

The body 76 of the rack guide assembly is preferably molded as one piece from an impact grade acetal and has energy absorbing cushions or protuberances 78 and 80 which form tubular shock absorbers on the opposite ends thereof. These shock absorbers are provided by the resilient thin walls of the corner openings 82, 84 which deflect on physical engagement with the end or stop walls 86, 88 (FIG. 3) of the rectilinear track 66 to thereby absorb energy and cushion impact for a material reduction in noise and to protect and reduce wear of the housing 30 as well as the guide assembly. This is particularly the case when the steering gear is actuated for full turns so that the stops provided by the end walls 68 and 88 of the track are encountered. When impact loads are removed, the shock absorber walls being resilient return to their original configuration. In addition to the cushioning protuberances or shock absorbers 78,80, the rack guide has laterally disclosed spring arm or slide members 90,92 integral with body 76. These members resiliently engage the sides 94, 96 of the tract 66 to provide a lash-free, sliding fit with the aluminum housing. Boot 100 of elastomeric material stretches over the rack and pinion housing from clamping 102 adjacent to valve 18 to clamp 104 which secures the boot to the power cylinder. With this boot and with end cover 106 mounted in the opening in housing 30, the internal components of the rack and pinion gear are enclosed and sealed and protected from the outside environment.

With this invention, the body of the guide can be readily molded as one piece from an impact grade acetal or other plastic material with integral cushion stops and spring fingers. This replaces the heavier and more expensive prior metallic bodies which often required anti-friction and lash componsating slides. On rotation of the pinion 24, the input gear to move the rack with power assist being provided through the appropriate charging of the power assist cylinder. On reaching the end of the travel at full turns, the shock absorbers will deflect to absorb the impact to reduce wear and noise. While the sliding movement of the rack guide occurs, the spring fingers permit the movement with reduced friction. The spring forces hold the rack guide in position in the rack to provide a lash-free fit.

While a preferred embodiment of this invention has been described to illustrate the principles of the invention, other embodiments will now become apparent to those skilled in the art.

The embodiments of the invention in which an exclusive property or privilege is claimed are defined as follows:

1. A rack and pinion steering gear for steering the dirigible wheels of a vehicle comprising a rotatable pinion gear providing a steering gear input, an elongated rack having rack teeth in meshing engagement with the teeth of said pinion gear and linearly movable in response to rotation of said pinion gear, a housing having wall means defining an internal passage way slidably receiving said rack, said wall means of said housing being formed with an elongated opening therein providing a track, said track having stop shoulders at opposite ends thereof, a rack bearing guide slidably mounted in said track, fastener means attaching said rack bearing guide to said rack, and tie rod means secured to said fastener means operatively connecting said rack bearing guide to the dirigible wheels of said vehicle and providing an output for said rack and pinion steering gear, said rack bearing guide having yieldable cushions at opposite ends thereof for the cushioned engagement with said stop shoulders of said track to limit the travel of said rack and the turning of the dirigible wheels attached to said tie rod means, and spring finger runner means attached to the opposite sides of said rack bearing guide for engaging a portion of said track to provide for the lash-free sliding fit of the rack bearing guide in said track.

2. A rack and pinion steering gear for steering the dirigible wheels of a vehicle comprising a rotatable pinion gear providing a steering gear input, an elongated rack having rack teeth in meshing engagement with the teeth of said pinion gear and linearly movable in response to rotation of said pinion gear, a housing having wall means defining an internal passage way slidably receiving said rack, said wall means of said housing having a track formed by an elongated opening therein said housing having stop shoulders at opposite ends of the opening forming the limits of the track, a rack bearing guide of plastic material slidably mounted in said opening means, fastener means attaching said rack bearing guide to said rack, and tie rod means secured to said fastener means operatively connecting said rack bearing guide to the dirigible wheels of said vehicle and providing an output for said rack and pinion steering gear, said rack bearing guide having resilient shock absorbers integrally formed at either end of the body thereof for the cushioned engagement with said stop shoulders to limit the travel of said rack and the turning of the dirigible wheels and resilient spring finger runner means integrally formed on opposite sides of said rack bearing guide for resiliently engaging a portion of said track to provide for the lash-free sliding fit of the rack bearing guide within said opening during steering operation.

3. A rack and pinion steering gear for steering the dirigible wheels of a vehicle comprising a rotatable pinion gear providing a steering gear input, an elongated rack having rack teeth in meshing engagement with the teeth of said pinion gear and linearly movable in response to rotation of said pinion gear, a housing having wall means defining an internal passage way slidably receiving said rack, said wall means of said housing having a track formed by an elongated opening in said wall means with stop shoulders at opposite ends thereof forming the limits of the track, a rack bearing guide of plastic material slidably mounted in said opening means, fastener means attaching said rack bearing guide to said rack, and tie rod means secured to said fastener means operatively connecting said rack bearing guide to the dirigible wheels of said vehicle and providing an output for said rack and pinion steering gear, said rack bearing guide having resilient shock absorber tubes integrally formed on opposite ends of the body of the guide for the cushioned engagement with said stop shoulders of said housing to limit the travel of said rack and the turning of the dirigible wheels attached to said tie rod means, and resilient spring finger runner means integral with the body of said guide and disposed along opposite sides thereof for resiliently engaging said track to provide for the lash-free and low friction sliding fit of the rack bearing guide within said opening during steering operation.

4. A rack and pinion steering gear for steering the dirigible wheels of a vehicle comprising a rotatable pinion gear providing a steering gear input, an elongated rack having rack teeth meshing with the teeth of the pinion gear and linearly movable in response to rotation of said pinion gear, a housing having wall means defining an elongated passageway slidably receiving said rack and having an elongated opening in the wall means thereof communicating with said passageway to form a track, said housing further having stop shoulders at the limits of said elongated opening, a rack bearing guide mounted for sliding movement in said track between limits established by engagement of said guide with said stop shoulders, fastener means attaching said rack bearing guide to said rack, tie rod means operatively securing said rack bearing guide to the dirigible wheels of said vehicle, shock absorber means at either end of said guide to cushion the engagement of said guide with said stop shoulders and limit the travel of said rack and the turning of said dirigible wheels of said vehicle, said rack bearing guide having resilient runner means engaging at least a portion of said wall means of said housing forming said track for the lash-free sliding fit of the rack bearing guide in said housing.

* * * * *